(12) United States Patent
von der Heyde et al.

(10) Patent No.: US 12,223,277 B2
(45) Date of Patent: Feb. 11, 2025

(54) GENERATING CONTROL COMMANDS FROM SCHEMATIZED RULE SETS

(71) Applicant: SemaLogic UG, Weimar (DE)

(72) Inventors: Markus von der Heyde, Weimar (DE); Matthias Goebel, Unna (DE)

(73) Assignee: SemaLogic UG, Weimar (DE)

( * ) Notice: Subject to any disclaimer, the term of this patent is extended or adjusted under 35 U.S.C. 154(b) by 559 days.

(21) Appl. No.: 17/470,668

(22) Filed: Sep. 9, 2021

(65) Prior Publication Data

US 2022/0083740 A1    Mar. 17, 2022

(30) Foreign Application Priority Data

Sep. 11, 2020   (EP) .................................... 20195834

(51) Int. Cl.
| | | |
|---|---|---|
| *G06F 40/30* | (2020.01) | |
| *G06F 16/31* | (2019.01) | |
| *G06F 40/211* | (2020.01) | |
| *G06F 40/58* | (2020.01) | |

(52) U.S. Cl.
CPC ............ *G06F 40/30* (2020.01); *G06F 16/322* (2019.01); *G06F 40/211* (2020.01); *G06F 40/58* (2020.01)

(58) Field of Classification Search
CPC ........ G06F 40/30; G06F 40/211; G06F 40/58; G06F 8/41
See application file for complete search history.

(56) References Cited

U.S. PATENT DOCUMENTS

| | | | |
|---|---|---|---|
| 10,762,301 B1 * | 9/2020 | Johnson | ................... G06F 40/40 |
| 10,795,902 B1 * | 10/2020 | Setlur | ................. G06F 3/04847 |
| 2008/0126080 A1 * | 5/2008 | Saldanha | ................ G06F 40/30 704/9 |
| 2018/0365593 A1 * | 12/2018 | Galitsky | ................ G06N 5/022 |

* cited by examiner

*Primary Examiner* — Richemond Dorvil
*Assistant Examiner* — Zeeshan Mahmood Shaikh
(74) *Attorney, Agent, or Firm* — Seed IP Law Group LLP

(57) ABSTRACT

A method for generating control commands includes providing a document that includes at least one declaration that formulates a rule set, parsing the at least one declaration to generate a plurality of syntactical blocks, constructing terms and symbols from the syntactical blocks to generate a semantic representation, validating the semantic representation, and generating at least one control command based on the validated semantic representation, wherein the at least one control command corresponds to the rule set formulated by the at least one declaration. The at least one control command can advantageously be converted into a plurality of platform-specific instructions for driving a target platform. There is further defined a device for generating control commands and a corresponding system.

14 Claims, 7 Drawing Sheets

GENERATING CONTROL COMMANDS FROM SCHEMATIZED RULE SETS

BACKGROUND

Technical Field

The present disclosure relates to methods, devices, and systems for generating control commands. The control commands can be fully automatically generated from a textual formulation of a rule set and translate a platform into a target state defined in the rule set.

Description of the Related Art

The operation or functioning of platforms, i.e., for example of individual devices, machines, appliances, network-based systems or of open- and/or closed-loop controllable systems, is typically specified by means of rule sets which are often summarized in schematized rule texts. These are provided so that the operation and functioning of the platform is documented and a larger number of persons can understand the operation and functioning. For driving the platform, in particular in the case of adaptations or new configurations, the rule texts often have to be read and interpreted by a technician and translated into an open-loop and/or closed-loop rule program that are then used for driving the platform. These processes are error-prone, so that typically complicated quality assurance measures have to be taken.

Further, in particular in the case of technically complicated platforms, already when formulating rule texts, cases of incompleteness and inconsistency can arise that may be difficult to identify and check in the rule text. As a result of this, even in the case of a correct implementation of the rule texts in open- and/or closed-loop control programs, the platforms can be programmed such that they are translated into states that are undefined, faulty or inconsistent which can lead to a malfunction and in the most unfavorable case to endangering the environment of the platform.

BRIEF SUMMARY

The present disclosure specifies a method and a device that automatically translate schematized rule sets or rule texts into control commands for driving platforms. The present disclosure further enables such implemented rule sets or rule texts to be validated in view of a regulated operation of the platform.

Thus, described herein is a method for generating control commands, a device for generating control commands, and a system having the features of the independent claims. Advantageous embodiments of the disclosure are defined in the dependent claims.

According to the disclosure, a method is specified for generating control commands that comprises providing a document that includes at least one declaration that formulates a rule set; parsing the at least one declaration to generate a plurality of syntactical blocks; constructing terms and symbols from the syntactical blocks, to generate a semantic representation; validating the semantic representation; and generating at least one control command on the basis of the validated semantic representation, wherein the at least one control command corresponds to the rule set formulated by the at least one declaration.

The method can be a computer-implemented method or a method that can be executed by a computer, a device or a computational device that can include at least one processor or a processing unit that executes instructions according to method steps of embodiments of the present disclosure.

The at least one declaration can be a declaration that is schematized, and can however be in the form of a text. It can preferably include a readable form in a natural language that is thus simple to read and understand by humans. The document and/or the at least one declaration can correspondingly include a schematized rule text that formulates the rule set.

The at least one declaration can be structured on the basis of a formal language to generate the plurality of syntactical blocks that in turn are used for constructing the terms and symbols. Constructing the terms and symbols can accordingly take place on the basis of the formal language.

The semantic representation can correspond to a logic-semantical overall representation that unambiguously represents both the semantics of the rule set and also its logical connections. Accordingly, the present disclosure comprises a transformation of schematized rule texts on the basis of a formal language into a complete unambiguous logic-semantical representation.

The semantic representation of the rule set can be validated for consistency and satisfiability. Alternatively or in addition, the validation can include further semantic-logical and/or temporary and/or structural properties. The validation can be a basis for subsequently generating the at least one control command. Accordingly, in various embodiments, the at least one control command can only be generated when the validation leads to a positive or admissible result.

In this way, from a readable, but structured declaration of a rule set, a validatable overall representation can advantageously be fully automatically generated so that it can be ensured that the control commands generated thereafter provide for a fault-free, consistent, and intended control of a target platform specified by the rule set. The target platform is preferably a technical system, a mechanical system (Internet of Things, IoT), a cloud system, a client system, an SaaS system (Software as a Service, Saas), a web interface, and the like, and/or open- and/or closed-loop control programs executed by the target platform.

Within the framework of the disclosure, the following terminology can be defined as follows.

Mathematical terms or expressions formulate by means of mathematical operators (e.g., the basic arithmetic operations addition, subtraction, multiplication, division) relationships in a compact, formula-based notation. In this way, the relation "gross price=net price*VAT rate" can be expressed in a compact manner and understood in the same way by many humans. The linguistic translation "The gross price corresponds to the product of net price and VAT rate" should here have the identical meaning, if "corresponds" is understood to be identical with "=" and the formulation "product of A and B" corresponds to the formula "A*B" on the semantic level.

In logic, logic statements that are not axioms (thus are not assumed for defining mathematics itself) are considered as "true" or "false" if these can be derived by equivalent transformation from the axioms. The combination of logical statements is, in this case, produced by the basic operations "AND" and "OR". Likewise, a "NOT" operation, as an inversion of a logical statement, can be regarded as such a basic operation.

In symbolic logic, six logical relationships (logical connectives) are formulated by statements. Accordingly, the symbolic logic can be superior to a "normal" logic.

When several logical statements are made about the same variables (or more generally about an "item"), the logical statements can be consonant or include contradictions. A contradiction is generally expressed in that two logical statements about the same item cannot at the same time be true and false. The provability of logical statements can have limits.

Texts that can be considered as natural language are texts that are subject to an intuitive understanding of language by people that have command of this language. Identical contents can often be reproduced by different formulations; on the other hand, formulations can really be non-unambiguous. In contrast, formal languages are designed such that statements are unambiguous. Mathematics and computer languages are examples of formal languages that aim to avoid the ambiguity of natural language statements.

In a textual analysis, different features are extracted from an existing text. On the formal side, these can be purely statistical statements (for example a number of letters). On the other hand, extraction of the coded intention, i.e., the semantic meaning, can likewise be a form of textual analysis. Processing a natural-language text by a computer with the aim of textual analysis can be designated as Natural Language Processing (NLP).

A statement can originate from a specific text section that was used during the analysis. To permit complete transparency, e.g., for an error analysis, there can preferably be generated an entire chain from a source in the text, for example from at least one statement, to a derived statement, for example a term of the semantic representation.

A meaning or intention that a text contains is designated by the term semantics. An abstract data-technical representation of this meaning of the text aims to make an equivalent form, i.e., having the same meaning, of the content accessible to the computer for further processing. This is preferably represented by the semantic representation.

Individual terms and statements often acquire a specific and unambiguous meaning only in a context. All rules to which the formulation of these relationships has to conform are termed grammar. The syntax in this case serves for defining several components of a clause and for specifying the permissible sequence in the clause structure.

Variations of natural language (e.g., across geographical areas) are termed dialect. Several dialects can intermingle or be distinguished from each other more strongly. Alternative language definitions that result from exchanging punctuation marks, symbols, as well as the syntax, can be regarded as dialects of the formal language.

Actors or actuators can constitute signals for controlling machines or an active intervention in existing processes. Here, the signals can comprise both electro-/magnetic signals as well as a change of physical quantities. Actors or actuators in further areas, for example in the area of the "Internet of Things" (IoT), instruction transmissions, for example in the form of HTTP requests or arbitrary protocol-based requests, or for example software-technical triggering actions of events, for example in the form of XML messages or otherwise structured messages in an Enterprise Service Bus or in micro-service architecture, can further likewise be termed actors or actuators. In this disclosure, the focus is placed on the general instruction transmission for controlling such software- or hardware-technical state changes.

A control can mean a targeted influence on a behavior of a platform (e.g., a technical system). A regulation can mean a targeted influence on a behavior of the technical system based on specific parameters, properties, and characteristics of the technical system. Correspondingly, embodiments of the present disclosure, when generating control commands, can exist in a systematic implementation of a sequence control, for example of a digital sequence control, that can trigger, either directly or on the basis of one or more among others, system states, properties, characteristics and/or sensor information and the rule set, actuators of the target platform or of the technical system.

A rule set is complete when the statements contained specify an issue without gaps in the definition. Such gaps can be, for example, missing statements for part systems that are mentioned without clarifying rules being assigned to them. Missing statements can lead to a situation that the satisfiability of the whole set is not verifiable. The validation of a semantic representation can provide information as to the completeness of the rule set.

A rule set can be satisfied, i.e., is consistent, when it is free from any contradictions, i.e., when there is at least one solution such that all statements contained in the rule set can be regarded as true. Since the statements of the rule set can formulate options or value ranges or can contain boundary conditions, a rule set can contain more than one solution. Contradictions in the statements can refer to parts (e.g., individual versions or part trees of the logical hierarchy) of the complete rule set. Accordingly, control commands can also be generated for one or more parts of the rule set that can be satisfiable.

When further definitions (e.g., within the framework of an instantiation) are made for a part of the statements, the satisfiability for the remaining degrees of freedom can be restricted. There is no satisfiability if there is no combination of the remaining options such that all statements of the rule set remain true. The validation of the semantic representation can provide information as to the satisfiability of the rule set for one or more instances.

Embodiments of the disclosure can be distinguished from a purely procedural control. Procedural or object-oriented computer languages place sequences, relationships, etc., into individual sequence steps by means of the principle "divide and conquer" so as to carry these out one after the other and as a function of if-then decisions. Closed loops can be represented in this manner and decomposed into manageable parts. It is often not possible to prove such algorithms in terms of their target achievement and their effectivity as an overall rule set. A rule set defined in embodiments of the present disclosure can describe a target situation but not necessarily assume a sequence of a program execution in this case but can also describe relationships on a purely logical plane that can optionally exist in a temporal sequence. A rule-based control can thus dispense with if-then structures completely. Instead, such relationships can be reduced on a logical level to the satisfiability of the overall rule set: 1) In the case of a non-satisfiability, the statements participating in the contradiction can be extracted so that control signals can be generated therefrom. As a result of this control, the entire system can be guided in one instance (composition of specific states) back into a permissible rule range. On the other hand, 2) within the framework of satisfiability, possibly individual options can follow as a necessary consequence from the rules. This consequence, too, can lead to control commands according to control sequences. Both cases can thus result in logically consistent steps that have to be undertaken in one design of the controlled target system according to the generated control commands to produce a consistent state or to further develop it logically.

Embodiments of the present disclosure can be distinguished from purely logical programming languages. Logical programming languages, for example Lisp or Prolog, in addition to knowledge also define how to flexibly handle the knowledge and with several language constructs. As a result, use of the languages is reserved for the expert who has to formulate for himself the effect of the logical investigation (e.g., inference) in a logical programming language. Embodiments of the present disclosure can preferably go beyond symbolic logic on two counts: in a choice of "n to m of k options" in the case of OR statements and/or an integration of temporal sequences, in an arbitrary combination. Embodiments of the present disclosure can encapsulate inferences internally and make available the consequence of the determined results in the form of control commands or open options. Use can, in this respect, be limited to defined purposes but can precisely on this account be applicable directly to a control task in the area of a platform that is to be controlled or of a system without deeper knowledge of the platform or the system. The inventive method therefore favorably closes the gap between the theoretical level of the logical programming languages and the specific control of a technical installation.

Embodiments of the present disclosure can be distinguished from purely expert systems. As a rule, expert systems consist of two components: a knowledge base and a set of methods so that additional conclusions can be drawn from the knowledge. This so-called inference at the same time is based on fuzzy conclusions. Heuristics are often applied where a complete investigation of the solution space would require too much effort. Therefore, a solution is determined that is sufficiently good, of which, however, it is not known whether this solution actually represents the optimum. Embodiments of the present disclosure can be distinguished. In the formal language, embodiments of the present disclosure likewise represent knowledge. However, a fuzzy (e.g., fuzzy-logical) representation is dispensed with and instead the specific interpretation of the formal language is established comprehensibly. The calculation of the solutions takes place completely in the implemented system and on this occasion avoids heuristics. In the disclosure, inference is not used for gaining new knowledge. Conclusions are drawn exclusively inside the rule system defined in the formal language.

Embodiments of the present disclosure can be distinguished from hybrid control systems. Event control is implemented technically in places where states of systems are processed in an "if-then" schematic. The advantage of an independent reaction possibility to specific states permits a temporally fast reaction, e.g., in human-machine interfaces. In such systems, restrictions are often carried out in terms of context by means of constraints so as to simplify the interaction with the user and to reduce inquiries/validations. Embodiments of the present disclosure are no dialog system that is in immediate interaction with the user and images without any restriction naturally written or spoken language. The disclosure is always bound to a specific context by the respective definition of a mapping of language symbols on the formal language level. An unambiguous processing of the rule set takes place within this context, where fuzziness inside the language symbols is formalized but not left to a free interpretation. Within the framework of the multi-step validation processes, during or after establishing the rule set, both formal errors and logical errors, and also recommendations for simplifying the rule set, are determined and can be fed back with reference to the "dialect" used by the user—both via an interface and also in the form of control instructions (e.g., triggering an event in the establishing system: when the rule set is generated in an integrated development environment and transmitted for validation to embodiments of the present disclosure, error messages can be transmitted back either directly and also via control instructions). Within the application of the rule for instances with target states, an embodiment of the present disclosure generates specific actions so as to achieve the target states in a manner consistent with the rule set.

Embodiments of the present disclosure can be distinguished from pure machine learning or the concept of Artificial Intelligence. Artificial Intelligence is about systems whose complex capabilities are in part aspects similar to human ones. Here, it is the aim of approximating the performance of humans (control of autonomous vehicles) or to exceed these (e.g., in Go or chess). These systems operate e.g., with methods of Deep Learning where the intermediate representations cannot be interpreted logically but apparently effectively achieve a good result heuristically. Embodiments of the present disclosure exceed the performance of humans on the level of the derivation of logical consequences and also the validation of complex statements. Nevertheless, this happens "only" on the basis of mathematical propositional logic which, in itself, is not regarded as part of the disclosure. The disclosure does not have to be a system that falls into the area of artificial intelligence since all statements remain mathematically answerable unambiguously and logically. Embodiments of the present disclosure react to inputs (rule sets and instantiation) deterministically, not heuristically or statistically.

Embodiments of the present disclosure can be distinguished from pure controllers. Technical controllers implement a control loop in direct coupling of inputs and outputs. The systems theory describes a plurality of different models. Depending on the regulator/controller, the specifications are here followed more or less strongly, so that, e.g., fluctuations in a technical system are dampened that otherwise could lead to instabilities as a result of temporal latencies. Models and methods, e.g., from cybernetics, investigate in which way natural systems correspond precisely to one of the theoretical models or how these can be modeled technically (black box approach). Embodiments of the present disclosure can be used as an implemented system on the basis of a rule set for controlling an installation. Here, however, the control signal refers to nominal states defined in the rules and it is expected that, e.g., driving a window is then carried out by a classical controller or actuator. The disclosure only specifies (e.g., by HTTP post commands) to this actuator to open a window, without this opening of a window itself being supervised in the implementation. The implemented system derives from the rule set only the logically required or feasible next step and passes this via suitable instructions onto executing actors.

Embodiments of the present disclosure can be distinguished from pure meta languages. Meta languages describe program concepts in an abstract manner. For example, in a Unified Modeling Language (UML), the relationships of objects and data structures and their flow through transformation stages of a program are described. In an analogous manner, how UML formulates objects and their relationships, the formal language formulated in the embodiments of the present disclosure expresses the semantic and logical content of a rule set, and the terms/symbols contained therein are structured in levels and put into relation to each other. However, the present disclosure goes beyond the definition of the necessary formal language in that the consequences arising from the rule set and an instantiation are used for closed-loop control.

Embodiments of the present disclosure can be distinguished from pure language translation. Language translations transfer meaning of text from a natural language (for example German) into another one (for example English). Even though the meaning contained therein is context-bound by the speaker's domain but otherwise can contain arbitrary words or expressions, the complete translation that preserves the meaning of the text presents a challenge for computer linguistics. Embodiments of the present disclosure do not have to be able to code any arbitrary contained semantic of a text. Rather, it is exclusively those parts of a text that are interpreted by the system that correspond to a previously agreed-on syntax and contain the intended logical expressions of the formal language. Expressions that have been recognized are transferred into the semantic representation. From there, the coded intention can be transferred into other languages defined by a predetermined syntax. Here, the meaning of the rules remains completely preserved. In the broadest sense, this transfer can be regarded as a translation but is exclusively restricted to constructs contained in the formal language. So, for example, emotional differences of poems would not be the subject of the formal language. Logical rules of association, options, and their temporal requirements however can be coded in the formal language and thus transferred into arbitrary other, equally formalized languages. A prerequisite for this is the suitable configuration of the state transitions of the syntax parser and of the dialectal symbols.

Embodiments of the present disclosure can be distinguished from pure speech comprehension. The central task of processing a natural language to achieve speech comprehension is the dissolution of the syntactical ambiguities present in natural language and also the comprehension of the semantic relationships across several clauses. The aim is to recognize the pragmatics (intention of the speech utterance) contained therein and to derive therefrom consequences or acts. The aim of embodiments of the present disclosure does not necessarily have to reside in generating a comprehension of the natural language or of purely natural-language texts. Embodiments of the present disclosure may require application of a formal language that is easily comprehended on account of its proximity to the natural language of people. The aim can be to unambiguously formulate logical relationships, but not at the same time to function in an abstract manner like a programming language. The formal language is adapted to the natural-language context of the domain of the user by means of the grammar and symbols that can be configured.

In an embodiment, the at least one statement in a declaration includes a textual formulation of the rule set. The textual formulation can be a natural-language text. The textual formulation in the statement can be coded arbitrarily in the document and stored correspondingly in the document, so that the document can be read by a computing device and made available as text, for example via a user interface.

According to a further embodiment, the at least one control command is a target-system-dependent control command. The at least one control command may be defined via an instance of a target system or of a platform such that, when the at least one control command is executed by the target system or on the platform, a desired target state can be reached.

In a preferred embodiment, the method further comprises a conversion of the at least one control command into a plurality of platform-specific instructions for driving a target platform. The at least one control command can be converted into platform-specific instructions according to a mapping. A control command can in this case be converted into one or more platform-specific instructions.

In an embodiment, the plurality of platform-specific instructions includes a plurality of actors that set the target platform into a target state. The actors can influence states, properties and/or parameters of the target platform in a targeted manner and query inputs relative to the target platform or states, properties and/or parameters of the target platform.

In a still further embodiment, the plurality of actors includes one or more of an actor for setting at least one parameter of the target platform, an actor for reading out at least one parameter of a current system state of the target platform, and an actor for querying an option. The actor for setting at least one parameter of the target platform or of the target system can be an instruction that sets the parameter in the target platform or in the target system when carrying out by the target platform or the target system. This actor can also be designated as a "set" actor. The actor for reading out at least one parameter of a current system state of the target platform or of the target system can be an instruction that reads out and makes available a value of the parameter in the target platform or in the target system when executed by the target platform or the target system. This actor can also be designated as a "get" actor. The actor for querying an option for at least one parameter of the target platform or the target system can be an instruction that queries a decision relative to a parameter in the target platform or in the target system when executed by the target platform or the target system or any computational device. For example, a value of the parameter can be envisaged in a range and the instruction can query a specific value (get actor). The plurality of actors can further include an actor using which the target system can be supplied with control instructions. This actor can also be designated as a state actor. Should several instructions induced by actors from the plurality of actors be classified in terms of their mutual priority as of identical value, for example by means of linearization rules, then ultimately a user-based decision can be included by means of the actor for querying an option. This actor can also be designated as a "NeedDecision" actor. In the case of a fully automatic control, such a state can be preferably avoided as long as the target system can be held in a well-defined state.

According to an embodiment, the conversion includes an enqueuing of the plurality of platform-specific instructions according to at least one linearization rule. The linearization rule can define a sequence of instructions for achieving a desired target state. This can be defined by mappings of the control commands onto the instructions for a target platform or a target system.

In an embodiment, the validation of the semantic representation includes automatically validating the rule set for at least one of completeness, consistency, or application to an individual case. The validation can lead to a statement whether the rule set is complete and consistent. The validation can further take place with a view to one or more instances. In addition, a target state can be defined for the target platform or the target system and possibly further substantiated by values of the instance.

In a further embodiment, the semantic representation includes at least one semantic tree, the semantic tree including a plurality of terms and symbols.

The at least one semantic tree preferably includes a plurality of elements, wherein one or more of the plurality of elements exhibits at least one reference to a further element of the plurality of elements.

The semantic tree can advantageously code relationships with each other according to references or hash tables and in this way increase the speed in terms of access to the referenced components of the semantic representation. According to an embodiment, the at least one reference is implemented by hashed lists and access indices.

In an embodiment, the validation of the semantic representation includes a recursive semantic tree analysis of the at least one semantic tree, the recursive semantic tree analysis starting with terms that represent roots of the at least one semantic tree. By mapping the semantic representation onto a forest and/or tree structure, validation can take place by recursive application of validation rules, thus enabling a particularly simple verification of the rule set. Here, a forest structure can include a plurality of the semantic trees.

According to an embodiment, the semantic representation includes at least one instantiation, the at least one instantiation including one or more values for symbols of the semantic representation. The instantiation or instance can define a state, target state, or a desired state of the target platform or of the target system. The at least one control command can accordingly be designed to reach the state when carrying out instructions by the target platform or the target system. The semantic representation can include several instantiations. In this case, the respective instance-dependent control commands can be generated. The instance-dependent control commands may depend on one another in a temporal sequence such that by means of the control commands at first a first state is produced and subsequently one or more further states.

In an embodiment, the method further comprises transferring the semantic representation into a formal text corresponding to the at least one declaration in the document. As a result, rule sets defined in a language and/or in a dialect can be transferred into a further language and/or dialect. As a result, the method can be achieved both in terms of a language-independent driving of a target platform or of a target system. There can further be formulated easily understandable descriptions of the operation, of the sequence, and/or of the functionality, optionally also for one or more instantiations, for the target platform or the target system in a fully automatic manner.

According to the disclosure, there is further specified a device for generating control commands, the device being designed to carry out a method according to one or more embodiments of the present disclosure. The device can access or otherwise receive a document that includes at least one declaration that formulates a rule set. The device can structure the at least one declaration to generate a plurality of syntactical blocks. From the syntactical blocks, the device can construct terms and symbols to generate a semantic representation. The semantic representation may be validated by the device. The device can generate at least one control command on the basis of the validated semantic representation, the at least one control command corresponding to the rule set formulated by the at least one declaration.

The device can be a device having a processor or a processing unit. The device can further include a memory that can store instructions that, when carried out, can arrange the processor or the processing unit to carry out the method according to embodiments of the present disclosure.

The device can be arranged according to preferred embodiments to carry out a method according to any embodiments of the present disclosure in any combination.

In addition, an inventive system is specified that comprises an open-loop and/or a closed-loop platform that can be put into a system state by means of at least one control command, at least one storage medium or a data carrier that stores at least one declaration that formulates a rule set for the platform, and at least one device that is arranged to generate at least one control command for the platform from the rule set formulated by the at least one declaration, the at least one device being arranged to carry out a method according to one or more embodiments of the present disclosure.

According to an embodiment, the at least one control command places the platform into a target state specified by the rule set formulated by the at least one declaration.

Embodiments of the method can include any components of the device or of the system in any combination. The embodiments of the device or of the system can further include functional logical components that can perform method steps of the method according to embodiments of the present disclosure in any combination.

BRIEF DESCRIPTION OF THE SEVERAL VIEWS OF THE DRAWINGS

Further advantages of the inventive device and of the method result from the following description in which the disclosure is explained in more detail using exemplary embodiments with reference to the appended drawings. In the drawings.

DETAILED DESCRIPTION

Figure 1:
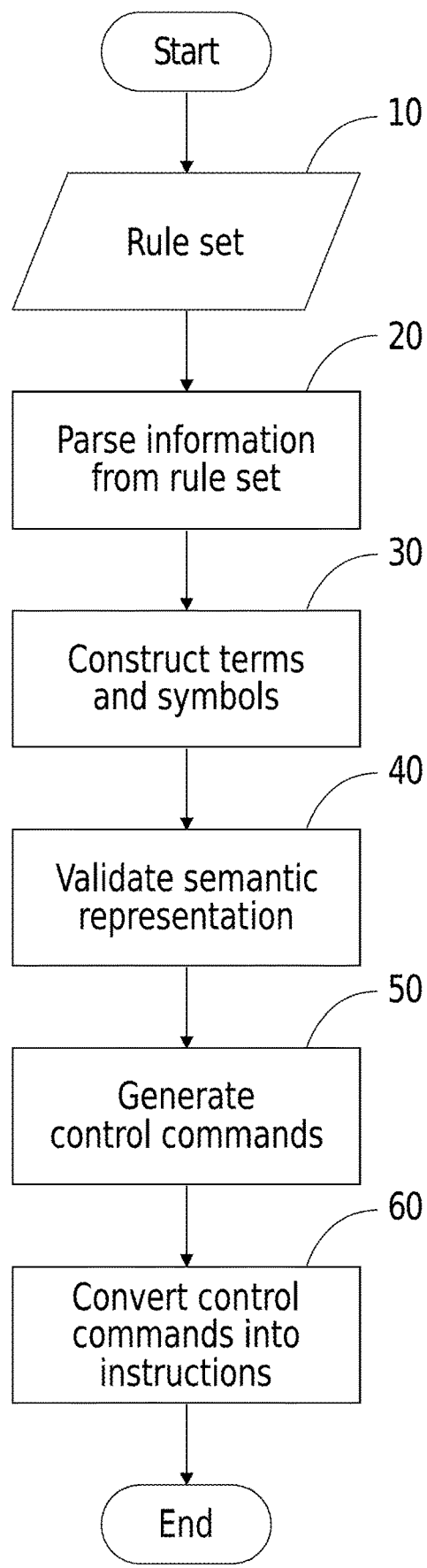
FIG. 1 shows a flowchart of a method for generating control commands according to an embodiment of the present disclosure.

FIG. 1 shows a flowchart of a method for generating control commands according to an embodiment of the present disclosure. The method effects the generating of control commands for a platform. Starting from a rule set 10 having at least one declaration that formulates the rule set 10 at least partly, the declaration is structured in step 20 to generate a plurality of syntactical blocks. In step 30, terms and symbols are constructed from the syntactical blocks to generate a semantic representation of the rule set 10. The semantic representation is validated in step 40. This can comprise an instantiation of the rule set 10 for one or more instances which may themselves be specified in the rule set 10 or which can result from states of the platform. In step 50, at least one control command is generated on the basis of the validated semantic representation. Here, the control commands correspond to the rule set 10 formulated by the at least one declaration.

In step 60, the at least one control command can optionally be converted into a plurality of platform-specific instructions for driving a target platform. The control command can include an instruction derived from the rule set 10 for controlling the target platform.

The platform is preferably a technical system, a mechanical system, a system in the area of the Internet of Things (IoT), a cloud system, a client system, and/or at least one open-loop and/or closed-loop program carried out on such a platform. The platform can be a technical system of any size. Therefore, the platform can be an industrial installation or an IoT device. The control commands can further configure any target system so as to configure, for example, a campus management system or a control system of a processing plant. Further systems are conceivable and are also comprised by the disclosure.

The method shown in FIG. 1 has the effect that a readable and comprehensible text (source text) can be used for defining the rule set 10, the text being converted automatically into the semantic representation to generate the control commands for a target platform. This enables a particularly intuitive use and definition of the driving of target systems that can at the same time be validated and be fully automatically converted into target-platform-dependent instructions.

Embodiments of the disclosure can thus concern a transformation of a formal text that however looks like a natural language into a semantic representation having logical statements with the aid of a defined formal language definition, from which representation in the technical implementation, for example by a computer program, an open-loop control or closed-loop control of complex production plants or other systems can be realized. An advantage of the open-loop control or closed-loop control of systems on the basis of the uniform semantic representation consists in the validatability of the consistency. The defined rule set 10 thus ensures both before and also during the open-loop control or closed-loop control that error states are avoided and that the path to a defined target state of the systems always remains deterministic.

In the process, system components can be summarized in a consistent logical model that guarantees the provability of rules of the rule set 10. This can enable practical applicability in the implementation that can include one or more of the following properties:

Generating control commands, including instructions or actors, while taking into account a target state of the rule set 10 that can represent a hierarchically logical and temporal overall rule set;

Establishing a count of to-be-chosen options of an "OR set";

Layering of levels of meaning;

Expected values that are only assigned at an instantiation of the rule set 10 for a specific application;

Integration of logical and temporal statements;

Formalizing of cases of fuzziness, for example as a result of value ranges;

Nested versioning of rule sets;

Backtracing of rules of the rule set 10 to the source in the source text;

Evaluation of mathematical terms related to levels of meaning; and/or

Use of a dialectal syntax defined by the user both for unambiguously extracting the semantic representation from the source text and vice versa also for generating a formal-language text from the representation.

An embodiment can also bundle a mapping of a symbolic logic that has the effect of a natural language that permits automatic and unambiguous evaluation of rule sets with an embodiment of the logic conclusions from the rules. The formulation of cases of fuzziness can be admitted in a controlled manner so that clear boundaries are defined and the predictability of the problem remains. The formal language on which the source text is based can connect temporal dependencies and logical connections in a way that deduction, rule conformity, and applicability to individual cases remain controllable. At the same time, the formulation of statements can remain as close as possible to an expert domain and linguistic designations of a user. This permits different users simple and readable formulation of logical rule sets relative to technical target systems and platforms.

In a particularly advantageous manner, embodiments of the present disclosure can control or regulate real production plants or other complex (computer) systems on the basis of the semantic representation that reflects the rule set 10.

Figure 2:
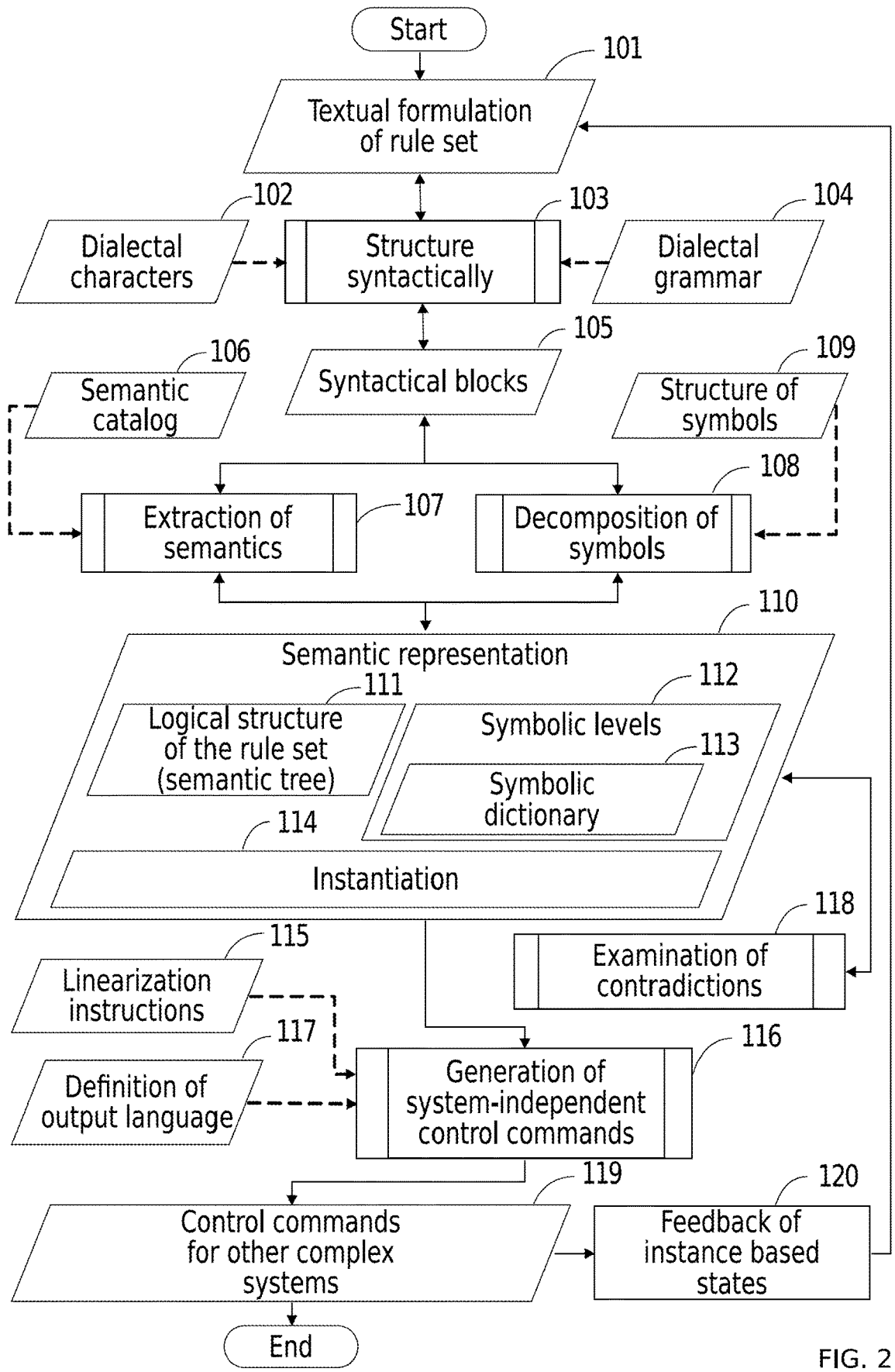
FIG. 2 shows a schematic illustration of a method for generating control commands according to an embodiment of the present disclosure.

FIG. 2 illustrates a schematic illustration of a method for generating control commands according to an embodiment of the present disclosure. FIG. 2 shows a schematic total sequence of an implementation for generating control commands from a rule set 101. The rule set 101 can be formulated as text, wherein a corresponding textual formulation of the rule set 101 can be converted via syntactical blocks 105 into a semantic representation 110 including their validation 118 and their instantiated evaluation for generating the control commands 119 that can be used for driving software- and/or hardware-technical systems. The conversion can include transformation steps of the syntactical structure 103, an extraction of a semantic 107, a decomposition into symbols 108, and resulting therefrom a generating of the target-system-dependent control commands 116.

The starting point for generating the semantic representation 110 can be the textual formulation of the rule set 101 in a formal text, wherein configured dialectal rules from characters 102 and grammar 104 are taken into account. The formal text can include both defined logical and temporal statements for the rule set 101 and also value assignments from one or more instances for symbolic levels as well as instructions, for example actor instructions, that are required for control. In this case, an instance can be a mapping of a specific situation for the rule set 101. As an example, sensor values of a system landscape to be contemplated or values of an entity of a software system can be mapped as system state. Here, the characters 102 and the grammar 104 can be converted within the framework of a syntactical structure 103 that is represented hereafter relative to FIG. 3 according to a preferred embodiment, for unambiguously interpreting the formal text into syntactical blocks 105. Preferably, text passages not relevant for the rule mapping but that may include additional explanations important for people, can likewise be extracted as the logical statements and their hierarchic structure.

After generating the structured syntactical blocks 105, within the framework of the extraction of the semantics 107 that is shown below in accordance with a preferred embodiment in FIG. 4, taking into account a semantic catalog 106, the defined (and permissible) logical and temporary statements as well as a version structure of the rule set 101 can be transferred into a semantic tree 111, preferably in referencing terms and versions. See in this respect also FIG. 5 for a preferred embodiment. In addition, independent from a logical rule hierarchy of the terms, the symbols/expressions that are freely definable in the formal texts, can be decomposed 108 by means of a structure of the symbols 109, and mapped as symbolic levels 112 with recognized symbol notations as a symbolic dictionary 113 in the symbol structure. In the case of the syntactical recognition of an instantiation 114, this additional value information of a symbol can be stored for deriving necessary control sequences of a rule evaluation.

This type of structure permits to transfer back the generated semantic representation 110 again into a formal text. Since during this back transformation a different dialect can be used, the formal text then generated can correspond to an expected dialect of the respective user, as a result of which the rule set 101 can be provided or displayed in a specific domain of the user.

After setting up the semantic representation 110 with the rule set 101, the latter can be validated independently of an instantiation 118. An advantageous design of the validation 118 is described below in relation to FIG. 7. In step 118, logical contradictions in the rule set 101 can be recognized even before an instantiation. This effectively prevents among others a faulty control of the systems before the rule set 101 is put into operation. Since the validation 118 can take place continuously, logical errors can be pointed out to the user even during the formulation of the rule set 101.

An instantiation 114 can set, for any rules, both current states and also a target state to be achieved of the rule set 101. The rules that have of necessity to be fulfilled for achieving the target state as well as the rules (or set of the open OR combinations) waiting for a decision can be determined and the actors can be generated that are as a result identified as missing 116. In a next step, the actors can be transformed to a linear sequence. For this purpose, temporal sequences as well as the affiliations to versions and a position in a rule hierarchy can be taken into account according to a current configuration of linearization commands 115. System independent control commands of actors can in this way be translated into instructions for other complex system 119 as defined by an output language 117. A definition of the output language 117 can, for example, include HTTP posts that can trigger directly the actors of other software- and/or hardware-technical systems via web services. However, it should be understood that the definition can include other instructions and other syntactical constructs that are suitable for defining the output language 117. In the previously mentioned exemplary embodiment, for example, a control of a Smart Home installation can be realized in the same way as an orchestration of cloud services from complex parallel computer systems.

To the extent that instantiations 114 can be transferred into the semantic representation 110 on the basis of control commands 119 (e.g., get actors concerning e.g., sensor values), feedback messages of instance-dependent states 120 can update the semantic representation 110 of the instance 114. This can take place continuously, i.e., at any time, in selected distances or intervals, or triggered, for example, when changing a state that is queried by the control command 119.

Figure 3:
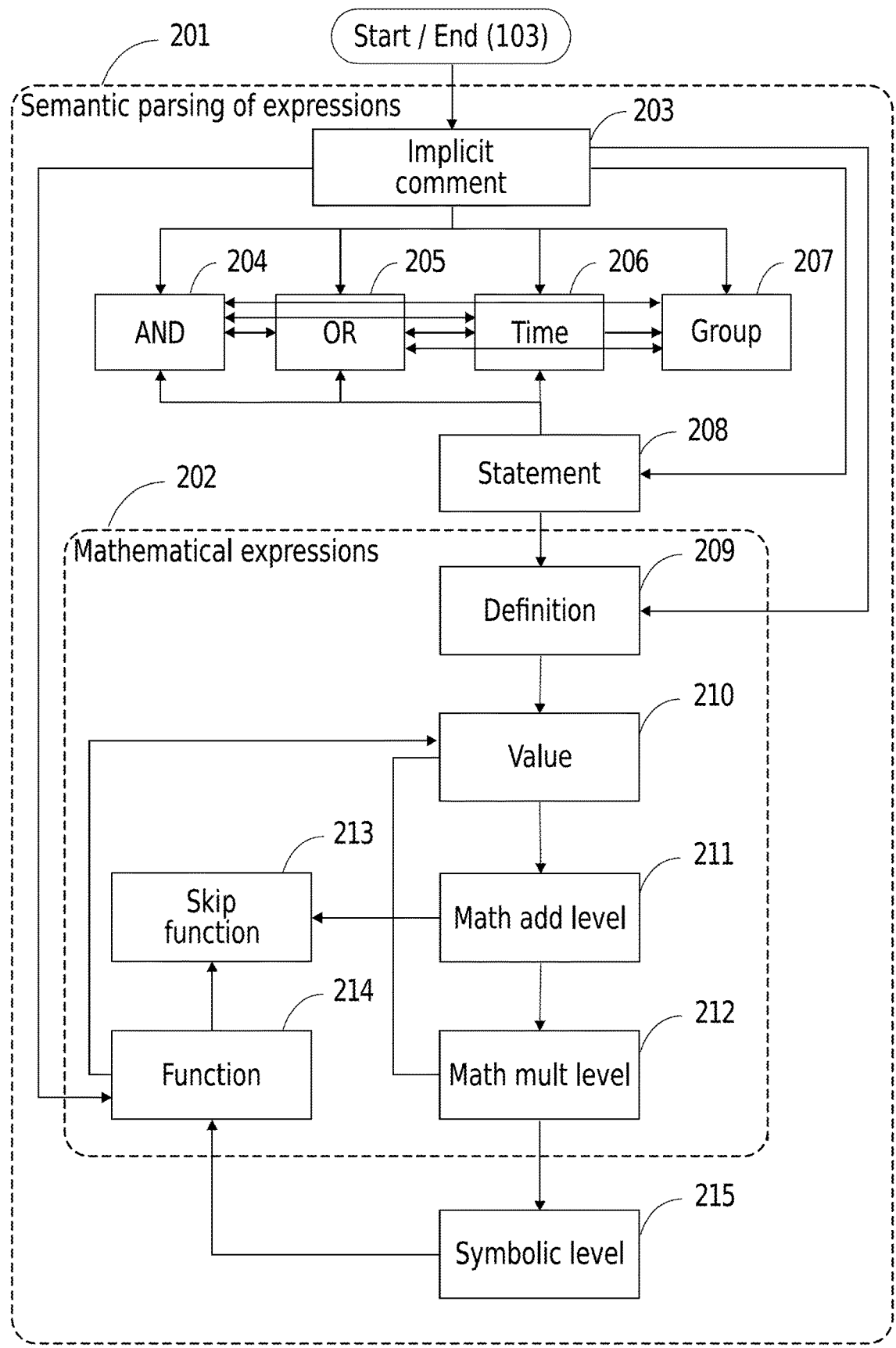
FIG. 3 shows a schematic sequence diagram of a method for syntactically structuring textual formulations of a rule set that is applicable in embodiments of the present disclosure.

FIG. 3 represents a schematic sequence diagram of a method for syntactical structuring of textual formulations of a rule set that can be applied in embodiments of the present disclosure.

The method illustrated in FIG. 3 can be built on the methods shown in FIGS. 1 and 2, for example in method step 103 of FIG. 2. However, in no case is this mandatory. FIG. 3 illustrates technical steps for translating a formal text by a recursive parser 201, for example the formal text for defining the rule set 101 of FIG. 2 or the rule set 10 of FIG. 1, into syntactically structured blocks that can correspond to the syntactical blocks 105 of FIG. 2. The components of FIG. 1 or FIG. 2 can correspondingly be referred to, this having to be understood as an example. In this way, the recursive parser 201 can presume as configuration, among others, the dialectal characters 102 as well as syntax definitions from the dialectal grammar 104 of the language to be analyzed and/or of the rule set 101.

An analysis and transformation of semantic expressions and mathematical expressions in the recursive parser 201 can be realized technically as a recursively-designed finite state machine that can be configured. Here, state transitions between all states 203 to 215 can represent the syntax definition as a dialectal grammar 104 of a source language. A state transition can in each case be established by a next, completely recognized character string or its alternatives from the dialectal characters 102, for example according to the following table. The area in front of a character that has been found can be processed by an action block, preferably including storage of a text source and of corresponding semantic meanings, and the area behind the last found character in the then following state can be continued in a linear fashion or with recursion. A recursion level can therefore correspond to a nesting depth of terms or mathematical expressions.

Here, the following tokens having the following meaning and coding can be chosen according to an example, the present disclosure not being limited to specific symbols, definitions, and descriptions.

| Name of the token | Character of the first alternative in the default dialect | Description |
| --- | --- | --- |
| SymTokenEqual | := | Assignment or definition |
| SymTokenAndOpen | [ | Opening the members of a set of statements connected by a logical "AND" |
| SymTokenAndClose | ] | Closing the members of a set of statements connected by a logical "AND" |
| SymTokenOrOpen | { | Beginning of the list of members of a set of statements connected by a logical |
| SymTokenOrClose | } | End of the list of members of a set of statements connected by a logical "OR" |
| SymTokenVersion | # | Delimiting of a version definition prior to the character from the following rule statement |
| SymTokenTimeBefore | « | Separation character between a symbol that should be temporally before another symbol or end of the symbol enumeration after temporal statements. |
| SymTokenTimeAfter | » | Separation character between a symbol that should be temporally after another symbol or end of the symbol enumeration after temporal statements. |
| SymTokenAdvice | ! | Beginning of a recommendation that starts after this character |
| SymTokenCheck | ? | Beginning of a validation statement that starts after this character |

-continued

| Name of the token | Character of the first alternative in the default dialect | Description |
|---|---|---|
| SymTokenGroup | ~ | Beginning or end of the list of members of a set of statements that are not connected logically, but are only possibly grouped under a new symbolic name |
| SymTokenFunctionOpen | ( | Beginning of a sequence of argument values for a function. The function name is expected in front of the bracket. |
| SymTokenFunctionClose | ) | Close of a sequence of argument values for a function. |
| SymTokenOpPlus | + | Infix operator for the addition |
| SymTokenOpMinus | – | Infix operator for the subtraction |
| SymTokenOpMultiply | * | Infix operator for the multiplication |
| SymTokenOpDivide | / | Infix operator for the division |
| SymTokenCompEqual | == | Comparison operator for identical values |
| SymTokenCompLess | < | Comparison operator for a smaller value |
| SymTokenCompLess-Equal | <= | Comparison operator for a smaller or equal value |
| SymTokenCompGreater | > | Comparison operator for a larger value |
| SymTokenCompGreater-Equal | >= | Comparison operator for a larger or equal value |
| SymTokenGlobalMax | +∞ | Symbolic replacement for the largest value to be assumed in intervals |
| SymTokenGlobalMin | –∞ | Symbolic replacement for the smallest value to be assumed in intervals |
| SymTokenAnnounced | % | Substitution character for announced values that are only provided during the course of an instantiation |
| SymTokenLimit | L | Suffix character for the delimitation of the value from an interval |
| SymTokenElement | , | Separation character between arguments of functions or value supplies (ranges) of symbols |
| SymTokenIDDevider | . | Separation character between hierarchy levels of symbols for the cascading of meanings |
| SymTokenInstanz | @ | Separation character between symbol and the designation of a specific instance |
| SymTokenInterval | \| | Separation character between the smaller and larger value of an interval |
| SymTokenEoS | ; | Character for the closure of rules. Following text passages are implicit comments as long as no statements in conformity with rules are made. |
| SymTokenLineComment | // | Character for the start of a comment inside of rule statements. The other characters up to the line end are not interpreted as a rule or mathematical term. |
| SymTokenCommentStart | /* | Character for the start of a multi-line comment that may include any number of characters and has to be marked explicitly with the comment end. |
| SymTokenCommentEnd | */ | Character for the end of a multi-line comment that may include any characters and has been opened explicitly with the comment start. |
| SymTokenSpace | " " | Characters that are ignored and are not regarded as content of symbols |
| SymTokenEOL | \n | Character that marks the end of the line and thus delimits the single-line comment. |

With this, arrows in FIG. 3 can correspond to a recursion transition between the states 203 to 215. The respective names of these transitions can correspond to the semantic constructs of the formal language. Exceptions are, for example, the state transitions that are needed for cascading mathematical terms (ignore function) and further transitions that can be summarized in the state 203 since these may concern, for example only, a discrimination of comments or error states when parsing as non-functional blocks. Within rules, line ends and blanks (or similar) can be ignored. In addition, after each line end in each case a potential version declaration can start that could be followed by a rule. When no rule follows, the interpretation stays with an implicit comment 203.

The recursive parser 201 can return into a previous state when a part text to be analyzed was finished and no further character was recognized for a state transition. In the case of bracket hierarchies or interspersed comments, this can lead to a multiple consideration of the same text section under the respective different interpretation of the current state.

The starting point of the recursive parser 201 for semantic expressions can be the implicit comment 203 since actual rules can be surrounded by any text. Inside the semantic expressions, AND terms 204, OR terms 205, temporal statements 206 and groups 207 can be nested in almost any way. An exception can be a nesting of temporal statements since these may preferably not be contained in neutral groups. Remaining text sections within the semantic expressions are always symbols which are stored as such still without decomposition 108 in the syntactical blocks 105. Semantic-rule statements themselves can potentially be encapsulated (with the exception of the pure group statement) as recommendations or as validation statements once via the assertion statement 208.

In the same manner, validation statements and recommendations can be a definition 209 as starting point of mathematical expressions 202 from a regulating context in the in each case other semantic context. Gradations of binding forces of mathematical operators in terms (the so-called operator sequence or precedence) can be designed in several state steps from a list of values 210 via the mathematical addition including subtraction 211 and multiplication including division 212 up to function brackets 214. On this level, function names cannot yet be distinguished from symbols 215 since here only a later analysis step can be in charge. Ignoring further function hierarchies in step 213 can enable grouping of interconnected clause structures when these are interrupted by insertions similar to a subclause.

During the course of the analysis in the recursive parser 201 when transiting the state transitions of the states 203 to 215, the syntactical blocks 105 can be generated as an annotation of the formal text of the rule set 101. These document preferably the original source of the text section that has been read and combine the respective text section with the meaning extracted by the dialectal character 102 and syntax. On this level, an assignment can therefore be carried out of individual characters of the respective configured dialect to the semantic meaning in the sense of the formal language.

According to an example, a configuration of the recursive parser 201 for individual state transitions can be provided as follows:

| Current starting state | Transition state when finding the symbol | Set of symbols | Action for text before the found symbol | State transition in the case of a recursion in the actions before the symbol | Action for text after the found symbol | State transition in the case of a recursion in the actions after the symbol | Assigned term type for generated syntax block |
|---|---|---|---|---|---|---|---|
| Section-Implicit-Comment | Section-Definition | SymTokenEqual | ActionCont, Action-Recurse | Section-Definition | { } | { } | Term-Define |
| Section-Implicit-Comment | Section-Group | SymToken-Group | ActionCont, Action-Recurse | Section-Group | { } | { } | Term-Group |
| Section-MathMul | Section-SkipFunc-Def | SymTokenFunction-Open | Action-UpdCurr-Pos, Action-Recurse | Section-SkipFunc-Def | { } | { } | Term-Type-Undef |
| Section-Definition | Section-Definition | SymTokenEoS | Action-Reparse | SectionValue | Action-Cont, Action-Return | Section-Success | Term-Value |
| Section-Value | Section-Value | Sym-Token-Element | Action-Reparse | SectionMath-Add | Action-Cont | Section-Value | TermArg-Element |
| Section-Symbol | Section-FuncDef | Sym-Token-Function-Open | Action-Reparse, Action-UpdCurrPos | Section-Symbol | Action-Recurse | SectionFunc-Def | Term-Type-Undef |

Figure 4:
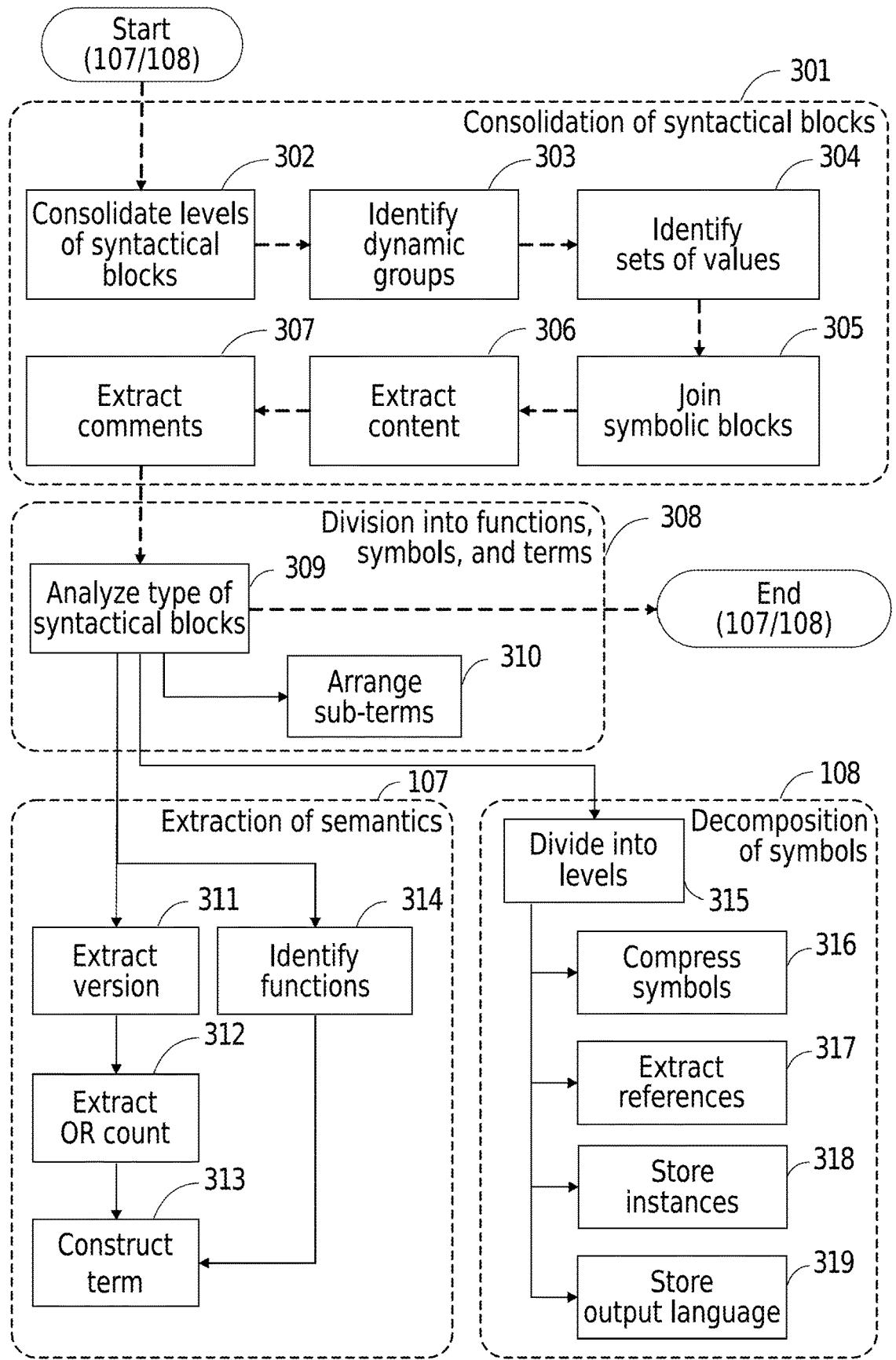
FIG. 4 shows a schematic sequence diagram of a method for transferring syntactical blocks into a semantic representation that is applicable in embodiments of the present disclosure.

FIG. 4 is a schematic sequence diagram of a method for transferring syntactical blocks into a semantic representation that can be used in embodiments of the present disclosure.

The method illustrated in FIG. 4 can be built on the method shown in FIG. 2, for example on the method steps 107 and/or 108. Other variants are also conceivable. In the method according to FIG. 4, reference can be made to the components of FIG. 2, this having to be understood as being exemplary. So, the processing can concern the syntactical blocks 105 generated from the formal text. Processing can take place using a parser.

The method can begin in step 301 with a linear method (dashed arrows) for all syntactical blocks 105 uniformly with a consolidation of the information contained.

Since recursion levels, in particular when parsing mathematical terms, can include gaps, these gaps can be reduced in that logically neighboring blocks are allowed to lie a maximum of one level under the direct neighbor. A corresponding consolidation takes place in step 302. At the start of groups, the parser does not discriminate whether the following symbolic values were used as dynamic groups as a result of interval designations. Therefore, this information can subsequently be determined on the basis of the existing total view of the syntax blocks, and the group type can possibly be changed to a dynamic group, which are identified in step 303.

Furthermore, use can be made of a discrimination of individual values and value sets so that an assignment of a value set to a symbol is interpreted as a declaration of all valid values (range). An identification of value sets takes place in step 304. In all other places in the rule set 101, a restriction of the actual values (in definitions and instantiations) can take place for a corresponding symbol in the respective hierarchical level so that implausible values can be reliably detected as soon as during the definition of the rule set 101 or during a handover of an instance.

Since comments may be embedded in the rule set 101 at any places (also inside of symbols), the corresponding syntactical blocks are summarized in step 305 such that the comments relative to a symbol can be processed separately from the actual symbol name. Corresponding to specific parent/child relations of the level hierarchy of the syntactical blocks 105, embedded comments are recognized and corresponding clusters of the syntactical blocks 105 and comments are formed anew.

Thereafter, the content of the syntactical blocks 105 can be discriminated unambiguously as to contents and/or comments without these overlapping further. The contents can be extracted in step 306. The comments can be extracted in step 307. The intermediate form of summarized sections of the formal text can then serve as the starting base for terms or a symbolic extraction or an identification of function names that are processed in the transformation step 308. Inside the transformation step 308, using the types annotated in the syntactical blocks 105 during parsing in the parser 201 that can also be designated as term types, formation of the terms, symbols, and functions, can be carried out in a recursive method (solid arrows).

For the term types from the area of the symbolic and mathematical expressions, terms (or sub-terms) are formed 107 and stored. Here, step 107 of FIG. 4 can correspond to step 107 of FIG. 2. Prior to the formation of a term, at first in step 311 a version declaration can be extracted as interval value if the term includes such a declaration. For OR terms, a further interval declaration may exist that can be read in step 312 and stored at the term. Finally, all data can be summarized in a new term object and the corresponding term type can be set according to the parsed information of the syntactical blocks 105 in step 313, as is shown below referring to FIG. 5 and a particularly preferred embodiment.

From predefined mathematical functions that may include any mathematical functions, for example one or more of min, max, count and further, and that can be identified in step 314, it is likewise possible to form sub-terms. The term object is generated in step 313. The term objects that have emerged can be inserted into a possibly already existing term tree after the recursion 310.

From syntactical blocks 105 that are not assigned to any term type (undefined), in step 108 symbolic identifiers can be derived and stored. Step 108 of FIG. 4 can here correspond to step 108 of FIG. 2. At first in step 315, different components can be separated from each other. In step 316, a determined symbolic name without spaces can be stored as a representation without upper-case/lower-case as "compressed" and according to levels. References can be extracted in step 317 and a corresponding reference type can be separated from the levels and likewise added to the symbol. In the case of values that are assigned to instances, these can be deposited in step 318 in a memory structure assigned to a corresponding instance name so that all values of the instance are present in direct access. For a definition of an output language, for example the definition of the output language 117 from FIG. 2, these values can be stored in like manner as instances. The declaration, for which value a driving of an actor has to take place, can be deposited as an interval so that for a defined value range the output can likewise take place 319.

It should be comprehensible that individual steps and sections of the method illustrated in FIG. 4 need not be provided in embodiments and/or can be carried out in any combination in a sequence different from that shown and at least partly in parallel.

The result of the processing according to FIG. 4 can be updated into a semantic representation, for example the semantic representation 110 of FIG. 2.

Figure 5:
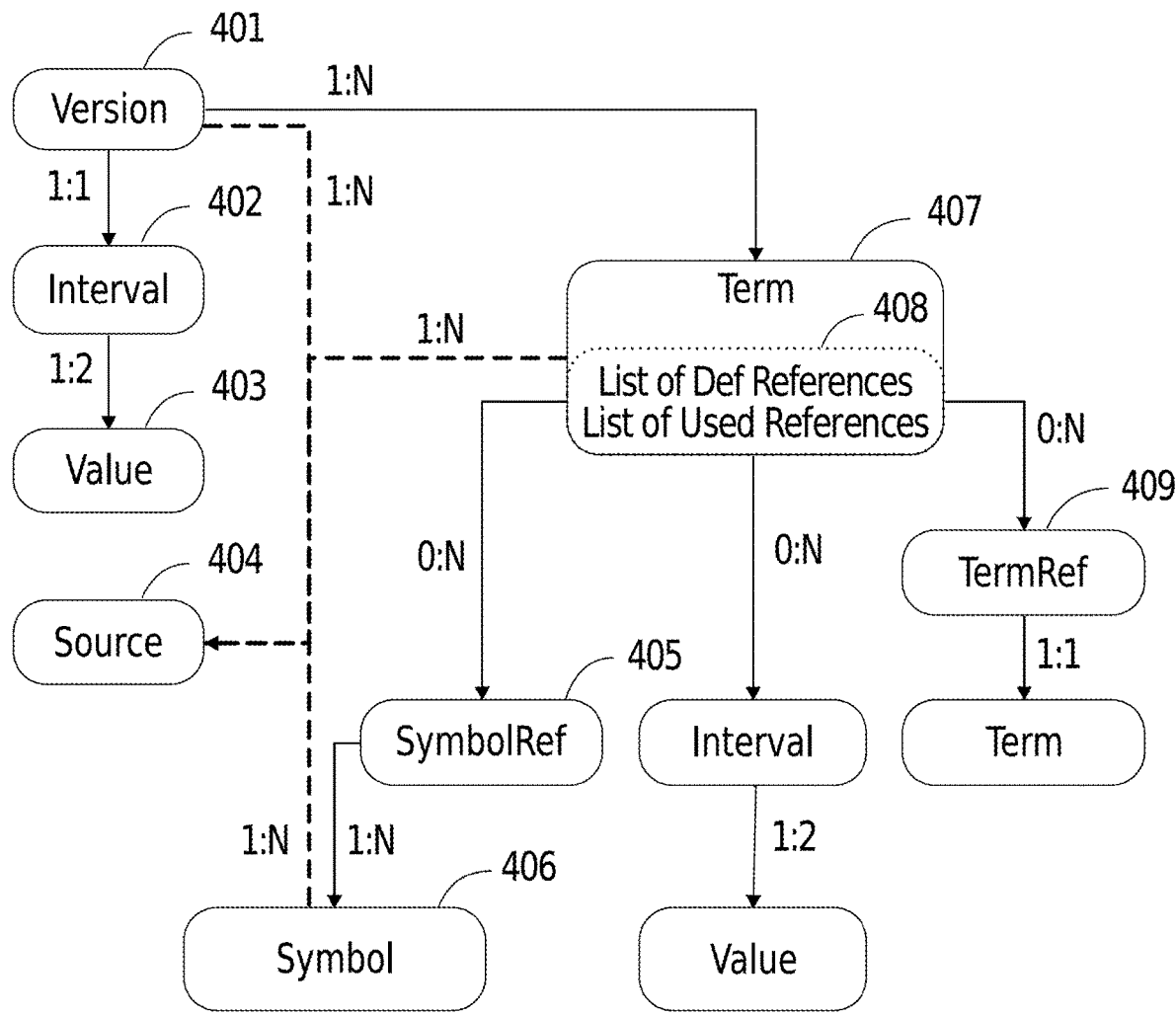
FIG. 5 shows a schematic illustration of a data structure for implementing a semantic representation that is applicable in embodiments of the present disclosure.

FIG. 5 shows a schematic illustration of a data structure for implementing a semantic representation that is applicable in embodiments of the present disclosure. FIG. 5 shows a technical setup for storing a semantic representation, for example the semantic representation of FIG. 1 or the semantic representation 110 of FIG. 2. In the structure according to FIG. 5, reference can be made to the components of FIG. 1 or FIG. 2, this having to be understood as an example.

ments. Here, each assertion statement can represent a graph without closed paths, for example as an out tree or a tree, wherein a term 407 can represent a root of the assertion statement. The version 401 specified in an assertion statement can refer to a version interval 402 that can include one or two values 403. The version 401 or a version object can additionally refer to all terms 407 and graphs or trees formed thereby having logical statements that correspond to the version interval 402. The term 407 or a corresponding term object can represent an assertion statement in an abstract manner that can include symbolic identifiers 405 and both further implicit statements 409 and also values and can also reference these. Since their sequence can be essential for the processing, the references can be stored subdivided into defined (List of Def References) and used references (List of Used References) 408. Preferably, all values (e.g., for mathematical functions) used in the terms can be stored in the form of intervals 402 with their value or values of any type.

Here, a validation for consistency to a value range defined elsewhere can be made possible. See, in this regard, FIG. 7. An additional reference to the source on which the objects are in each case based can enable a direct backtracing between error or later control instruction and the causative rule leading to a marked increase in the transparency. Implicit comments that have been recognized can likewise be stored at the respective assertion statement or directly at the symbolic identifier. The data structures used in the implementation are shown in the following table that by way of example shows an overview of elementary structure contents.

| Main structure | Fields/Structure | Description |
| --- | --- | --- |
| Term | UID | Unambiguous ID of the term for referencing |
| | MyType | Semantic type (AND, OR etc.) |
| | Value[ ] | List of intervals |
| | ListofTermRefs[ ] | List of references to hierarchically dependent terms |
| | ListofSymbolRefs[ ] | List of references of the defining and used symbols |
| | MySource[ ] | Reference list to the source information of the term |
| | MyRootTerm | Reference to the term root of the entire assertion statement |
| | MyVersion | Reference to the mentioned version of the entire assertion statement |
| | ListofDefRefs[ ] | Sorted reference list to Value, TermRef, SymbolRef of the defining references |
| | ListofUsedRefs[ ] | Sorted reference list to Value, TermRef, SymbolRef of the used references |
| Symbol | Name | Unambiguous semantic name of the symbol level (adjusted by upper-case/lower-case variants, distinction of cases etc.) |
| | ListOfOtherNames[ ] | List of used alternative notations |
| | ListOfDefTerms[ ] | List of references to terms in which the symbol is included as defining symbol |
| | MySources[ ] | Reference list to the source information in which the symbol is used |
| Version | Name | Identifier of a version |
| | Range | Interval of validity of the dependent terms |
| | ListOfTerms[ ] | List of references to all terms having the same version range |
| | Overlap | Identification label, whether the version range overlaps with another version |
| | MySource[ ] | Reference list to the source information of the version |

Logical statements can be mapped by means of three structures, including a version 401, a symbol 406, and a term 407. Their source in terms of a referencing to the place in the rule set 101 or 10 can be mapped by a source structure 404. Logical statements can also be viewed as assertion state- A realization of specific instances can use the same methods for parsing and extracting and also decomposing the symbolic identifiers 405 into individual symbols 406 as well as instance and reference information. Corresponding instance rules having assigned instance values can be managed under a symbolic name in a hash table. Additional information (for example the point in time of the transfer of the instance value) can be recorded since, by taking into account commands for linearizing, possibly a state update of the instance should be triggered. See also block 116 in FIG. 2 and step 501 in FIG. 6.

A special feature of the data modeling according to FIG. 5 is in the redundant form of the management of the semantic representation. On the basis of term structures that include direct references to the symbols, (sub-) terms and intervals, all main structures can mutually reference via hashed lists. In addition, over the entire mutually referencing graph and/or tree structure, superordinate access indices can lie that permit direct hash table accesses despite variable version intervals and term tree structures. In an embodiment of the present disclosure, the knowledge is therefore managed hierarchically along the meaning of the rules of the rule set 101 and also in a direct linear database-like form, so that effective parallel and efficient evaluation and storage can take place.

The illustrated data structure forms an efficient base for rule validations, validations of instantiations, and a derivation of the control commands resulting therefrom, as is, for example, illustrated in FIG. 2.

Figure 6:
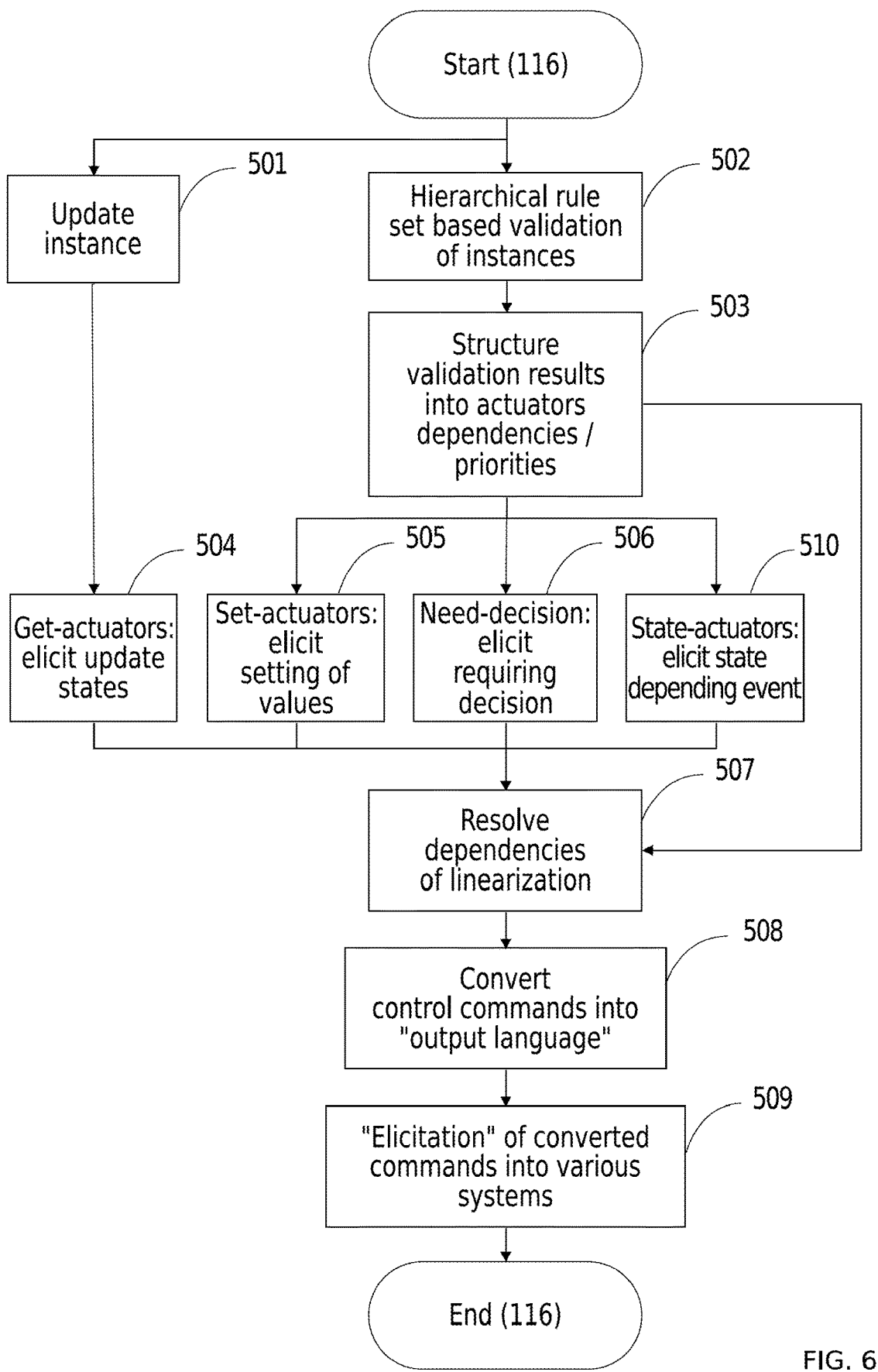
FIG. 6 shows a schematic sequence diagram of a method for generating target-system-dependent control commands that is applicable in embodiments of the present disclosure.

FIG. 6 shows a schematic sequence diagram of a method for generating target-system-dependent control commands that is applicable in embodiments of the present disclosure.

The method illustrated in FIG. 6 can be built as an example on the method shown in FIG. 1 or FIG. 2, for example in method step 50 of FIG. 1 or method step 116 of FIG. 2. Reference can accordingly be made to the components of FIG. 1 or FIG. 2, this too having to be understood as an example. FIG. 6 illustrates how target-system-dependent control commands, for example the control commands 119 of FIG. 2, can be formed. The rule set 10 or 101 definable by the semantic representation 110 can include a markedly larger function range than other often used description means of control algorithms (e.g., truth tables, logic plans, relay circuits). The extent of logical statements while taking into account versions, enlarged OR sets and temporal statements can enable a formulation of complex and at the same time manageable rule sets. As illustrated in FIG. 6, one or more target states can be defined from an overall rule set in the form of the semantic representation 110 by instantiation to finally derive control commands therefrom.

A hierarchical rule set validation of the respective instantiation can form a basis for generating control commands in step 502 that takes into account achieving target states. The validation results resulting therefrom are structured in step 503, after which validation results are assigned to one of the different actors on the base of an action to be taken or can be added to a linearization in the case of dependence statements. When symbolic identifiers have to assume exactly one value in order to reach the target state, the states can be brought about by executing set actors 505. In case options from extended OR conditions cannot be completely resolved for reaching the target, an embodiment of the present disclosure requires further decisions before the target state can be reached. In this case, they are NeedDecision actors 506. In addition, temporal dependencies of the rule set and system-specific commands of the linearization can be taken into account for forming serial and/or parallel actor sequences. This can take place in accordance with the linearization instructions 115 from FIG. 2. When a state is reached explicitly or by means of a semantic necessity, a state actor 510 can generate the corresponding control commands.

Provided a system requirement must generate an instance update 501, get actors 504 can be generated for all states that can be queried, in order to have system states be newly determined in the target systems and to have them enter newly as instance-dependent back information of the target system into the instance states, to update the further steps and corresponding control commands for reaching the target state.

Finally, the generated actor instructions 504, 505, 506, 510 according to the linearization commands in step 507 can be brought into an unambiguous sequence. This can correspond to an instruction chain for a controlled system. The formed sequence of the actor instructions 504, 505, 506, 510 for symbol levels can be converted in step 508 into target-system-specific directives that can be understood as definition of an output language. See block 117 in FIG. 2, at which symbols for triggering the actors can be deposited. In step 509, a control can take place with the aid of the corresponding converted actor instructions in the target systems.

Figure 7:
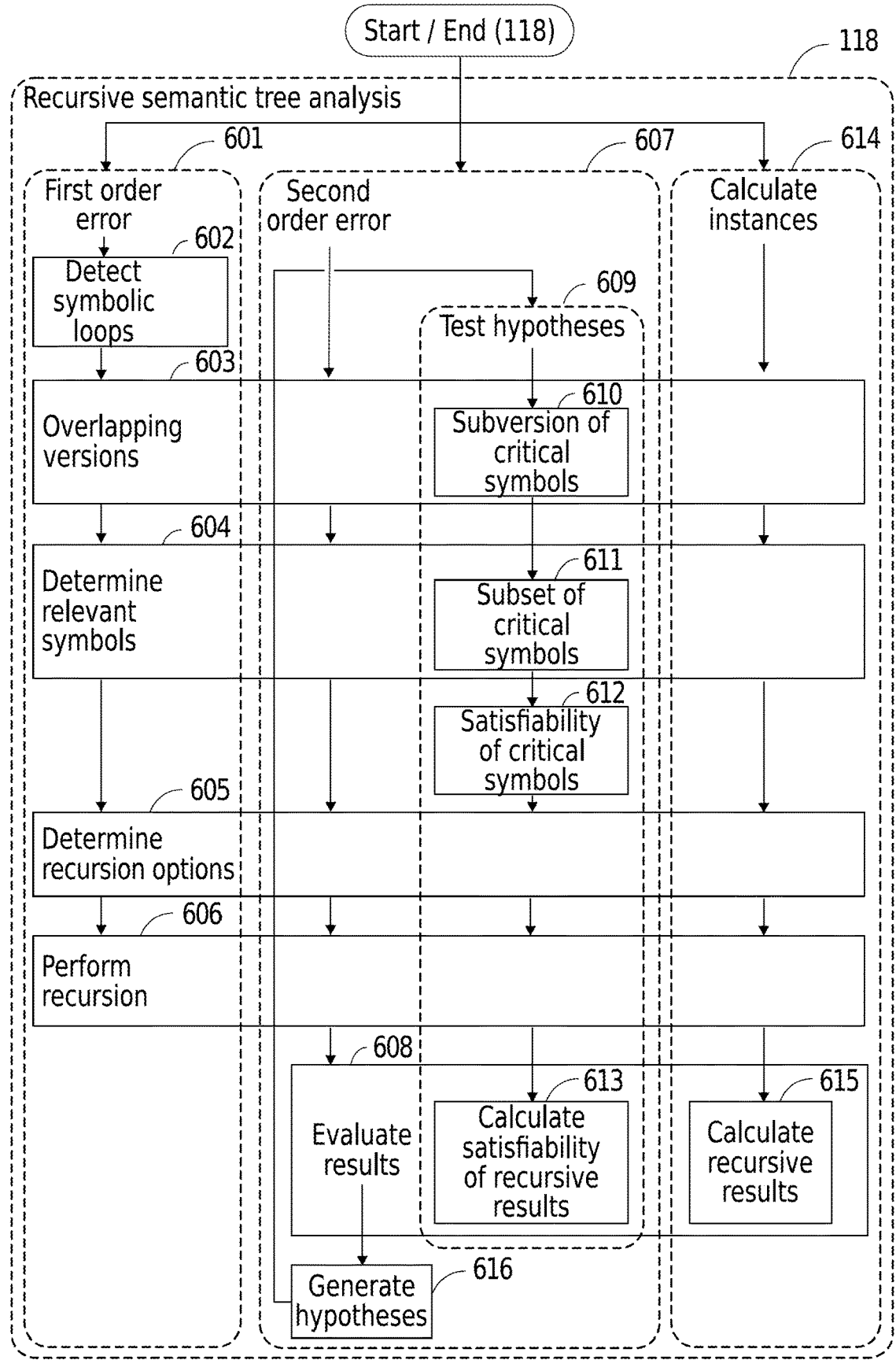
FIG. 7 shows a schematic illustration of a recursive semantic tree analysis that is applicable in embodiments of the present disclosure.

FIG. 7 is a schematic illustration of a recursive semantic tree analysis that is applicable in embodiments of the present disclosure. FIG. 7 shows how an embodiment of the present disclosure can perform the analysis to find inconsistencies, contradictions, and potential optimizations in a rule set, for example the rule set 101 from FIG. 2. The same sequence structure can be used on top of this to carry out calculations that were defined by the rule set. In doing so, at the same time the decisions that have already been taken implicitly, can be extracted to rules or the open options for a future manifestation of a specific instance can be derived.

The method illustrated in FIG. 7 can be built in an exemplary manner on the method shown in FIG. 2, for example in method step 118. However, in no case is this mandatory. FIG. 7 can refer in an exemplary manner to components of FIG. 2.

An embodiment of the present disclosure evaluates the semantic representation in several phases built on each other and considers in particular semantic trees that have been mapped in the semantic representation, resp. the semantic tree 111 of FIG. 2. Here, the evaluation follows the same schematic of the semantic recursive tree analysis 118 that in the literature is also called backtracking. The general sequence for recognizing first order errors 601, second order errors 607, and the calculation of results 615 can thus be identical. Functions that are equally applied in all areas are therefore drawn in FIG. 7 across the entire width of the diagram, for example steps 605 and 606. In some sequence steps, for example step 603, these basic functionalities can be supplemented with or replaced by specific additional validations or sequences, for example in step 610.

A semantic representation, for example the semantic representation 110 of FIG. 2, can include errors of different orders that can be summarized into two classes solely on account of their similarity in the treatment. Errors can arise at all only since logical expressions may satisfy the grammar (syntax and punctuation marks), but can otherwise be meaningless or contradictory.

The recognition of errors of the first order 601 can include one or more of the following cases in any sequence and combination:

Self-references of symbolic statements or mathematical terms. In the meaning of terms, it is forbidden to require or to verify a statement by means of itself. Expressed more simply, symbols may not be defined by using themselves. Statements will not turn verifiable or cannot be derived as a result of cyclical references of this kind in any part statements. However, the definition of recursive formulae is allowed since the new definition of a variable of a subsequent generation is based on the known generation (step n+1 is based on step n).

Identical symbols at different places have to refer to identical units. For example, the assignment of a school grade in the number range 1 to 6 cannot be referenced without "translation" to the verbal form "very good" to "unsatisfactory".

Symbols have to be within the possibly defined value range. In the case of school grades, for example in the elementary school, often integers in the range 1 to 6 are used, whereas in the upper school the score 0 to 15 is used. Therefore, an assignment of a grade as a computational basis of a grade average has to be in the correct (therefore agreed-on) value range.

The analysis of these types of errors can establish the faultiness of a term directly (without further analysis of the remaining rule set) using the stored data. In an embodiment of the present disclosure, it is therefore called "first-order error".

For the complete investigation of the rule set in terms of these errors, all genuine root terms can be subjected to a recursively designed part analysis in step 601. Genuine roots are those rule statements that define a symbol that is not used in any other term as a symbol for the definition of other terms. The recognition of loops in a recursive processing can at first require a comparison of the specific investigated term with all the terms already considered from the root 602. The following steps can be reduced with the use of the version interval used in the term 603. To the extent that no explicit version is used, the general version ($-\infty$ to $+\infty \rightarrow$ always corresponds) can be the basic assumption. In terms of their effect, versions can be nested by interval declarations and restrict this general basic assumption further and further. In the extreme case, the restriction to a specific version name as interval of a value is the most specific form of a version.

A selection of the relevant symbols 604 resolves the group formation provided in the semantic representation. Logical statements (AND, OR and temporal relation) do not refer to a defined group symbol but equally to all members of the group. An OR selection of the group A of symbols B, C, D shall likewise be equivalent to the selection from B, C, D and not comprise the group A as symbol. The latter would correspond to an AND combination of the mentioned symbols under the name A which is just what a group does not do. Since groups (and also dynamic groups) can again directly include groups, the determination of relevant symbols is to be carried out recursively.

A recursion from the roots to the leaves in a semantic tree is to be carried out when sub-terms are present or rules specify the used symbols further. So that an evaluation can be carried out in a structured manner after the recursions, at first the recursion options are determined 605. Corresponding recursions can, according to a versioning of rules, possibly be provided a plurality of times for different version intervals and carried out 606. In the case of the first order errors, the determined errors are collected in a structured manner but no further calculation using the terms is carried out. This changes in the other embodiments of the recursive semantic tree analysis 118.

The recognition of second order errors 607 can analyze one or more of the following cases in any sequence and combination:

Logical contradictions between required AND conditions and exclusive OR conditions. The necessary choice of precisely only one option of A or B for example contradicts the demand that A and B are satisfied at the same time. This error type has many varieties since in one embodiment of the present disclosure the OR sets are definable by "n to m from k options".

Equivalent to the AND/OR conflict, there are potential contradictions in mathematical terms in the case of contrary greater-smaller relations and other equal/unequal constellations.

As a result of temporal sequences, such contradictions are likewise imaginable, but on the logical level they lead identically to first order errors since the participating symbols even here lead to a circular argument.

The analysis of this error type can determine the error only in a logical evaluation 608 of the actual terms through combinatorics or symbolic reshaping. An embodiment of the present disclosure realizes the validation on the basis of the combinatorics of critical symbols that participate a multiple of times in the definition of statements in a version interval—i.e., in different terms. For all identified potential sources of logical errors, solution hypotheses are generated 616 and tested likewise recursively for corresponding part trees 609. A restriction of the combinatorics to the necessary cases of subversions 610 and subsets of critical symbols 611 poses an advantage over the otherwise theoretical brute-force methods in which the rule set is to be tested for all mathematically constructible combinations of the symbols and their values.

The mathematical satisfiability of the part terms 612 can be carried out such that terms are evaluated without any assumptions on the state of the "uncritical" symbols. When a state of a tested hypothesis cannot be satisfied, even though no assumption is made as to the other symbols, the corresponding sub-term is regarded as impossible. In the summative merger of the existing solution options 613, impossible and possible options can be offset according to the logical rules and aggregated via the semantic tree up to the root (or part evaluation).

The recursive evaluation of the semantic tree for instances in step 614 uses the same sequence structures but can calculate the values of the sub-terms 615 with the aid of the mathematical formulae and instantiated values instead of the pure satisfiability of statements. Sub-terms to which is necessarily assigned a specific value of an instance on the basis of the rules in the calculation recursion are included in a list of the necessary sequences for this instance in order to derive therefrom corresponding control commands and corresponding instructions. See likewise step 502 in FIG. 6. Open options for a future manifestation of a specific instance remain as a restriction of the options originally defined in the rules and thereby permit an effective further processing of the instance (reduction of the combinatorics) and corresponding communication of the remaining decision options to the user or to another system. See, in this regard, step 506 in FIG. 6.

The following aspects and/or advantages may be of particular relevance in one or more preferred embodiments of the present disclosure:

An embodiment can concern an implementation of a logic-based control of other production plants and systems (including other computer systems) using entangled versions that enable a definition of target states and full transparency between generated system logic and the source information of all logical statements and instance values.

A count of base terms from AND and/or OR statements can be strongly reduced by means of the concept of then out of m of k options of a flexible OR operator and thus be made accessible to the closed-loop control. A statement from one line may require potentially thousands of statements in a base logic that can practically be no longer processed as combinatorics. Thus by means of the concept of the n out of m of the k options of a flexible OR operator an open-loop control can be made accessible in that only those symbols of the semantic representations are used for the specific validation of a closed-loop control that are dependent on the currently considered logical rules and all other symbols are simply considered in terms of quantity.

Furthermore, a combination of all language elements into a consistent control logic can be a) determined without execution of error states, b) determined for options remaining for any instance hypotheses, and/or c) effectively reduce the technically non-processable (storage place) or generatable (temporal length) full combination tree to relevant part statements.

The use of dialectal language flexibility can take place both on the level of punctuation marks, the syntax of rules, and also in the output of control commands and corresponding instructions which permits a text having a natural effect to be understood equally and unambiguously as a rule set by humans and machines.

There can further be envisaged an implementation of a logic-based open-loop control of other production plants and systems (including other computer systems) with entangled versions, with the possibility of the definition of target states and full transparency between generated symbol logic and the source information of all logic statements and instance values.

An implementation can preferably use all language elements in a consistently technically usable control logic a) to thereby determine logic error states before a rule set is used for driving production plants or systems, b) for any instance hypotheses which from a concrete compilation of selected states can correspond to plants and systems relevant in the rule set, to determine the remaining options, and/or c) to be able to generate a technically processable combination tree reduced to the relevant part statements and to enable a time-based system control.

An implementation can preferably enable users to establish a logical rule set without having to carry out a specific implementation of a procedural, object-oriented, or logical programming language since the use of the dialects enables a naturally appearing text both on the level of punctuation marks and the syntax of rules.

The present disclosure further refers to the following exemplary embodiments that can be combined with embodiments and examples of the present disclosure in any manner.

An exemplary embodiment specifies a method for generating control commands that comprise the following method steps in any combination: Parsing declarations in a rule set as a syntactic structure that converts a textual formulation of a rule set into syntactical blocks, in that relevant passages characterized by an agreement with a language defined by keywords and sequences and thus restricted, are parsed unambiguously from the rule set with the aid of a recursive parser, controlled by different states, context-dependent in a hierarchized sequence of character strings, for example syntactical blocks; constructing terms and symbols consisting of an extraction of a semantic and decomposition of the symbols for generating a logic-based tree-like relation between freely definable symbols parsed by levels, for example a semantic representation of the overall rule set, in that after a consolidation of the syntactical blocks. a recursive division into functions, symbols, and terms takes place that either identifies semantic structures or decomposes remaining character strings as symbolic expressions and finally stores together as version, source, symbol, and/or term as well as their mutual references and value ranges as interval; automatically validating the semantic representation for contradictions in view of completeness, consistency of the rule set, or its application to an individual case, in that as a result of a recursive semantic tree analysis of all simultaneously valid rules (i) first order errors are identified without symbolic context, (ii) second order errors with symbolic context are identified by evaluation of generated solution hypotheses that are tested exclusively on the basis of critical, multiply-occurring symbols for satisfiability, and also (iii) a calculation of instance values is carried out; generating system-independent control commands and conversion of the control commands into system-specific instructions for controlling other complex systems in that the continuous instance updating and the hierarchical validation of the instances in the rule set at first reflect, in a system-independent manner, the status as a tree illustration, then are linearized and translated into an output language, to trigger control actions; repetition of the previously mentioned method steps for continually updating the control commands for other complex systems while taking into account the feedback of instance-dependent actual states in that event-based new states in the form of instance values or updating of rule specifications update a control base and thereby keep other complex systems within the desired state specified by the rule set.

According to a further exemplary embodiment of the method, a specification by a user of domain-specific dialectal characters changes all keywords for detecting boundaries between the meaningful passages when parsing the syntactical structure into the syntactical blocks.

According to a further exemplary embodiment of the method, the specification by the user of a domain-specific dialectal grammar changes the expected sequence of meaningful passages when parsing the syntactical structure into the syntactical blocks.

In an exemplary embodiment of the method, the specification by the user from a domain-specific semantic catalog changes the assignment of logical operators and functions and the identification of functions in the extraction of the semantics.

In a further exemplary embodiment of the method, the specification by the user from a domain-specific structure of symbols changes the separation into meaning levels and the identification of polyvalent symbol variants as compression of the symbols into unambiguous representations during the decomposition of the symbols.

Moreover, in an exemplary embodiment of the method, symbolically represented rules, instances, and symbolic levels of the semantic representation from the textual formulation of the rule set are defined from each other by extraction of at least one declaration of a symbolic version designation and thereby the formulation of rule sets as well as control of systems in their specific instantiation reduced and thereby simplified and formulated to be comprehensible by humans.

According to a further exemplary embodiment of the method, as a result of the specification by the user from a domain-specific formulation of commands to a linearization, the generation of system-independent control commands for other complex systems is altered.

In an exemplary embodiment of the method, the specification by the user from a domain-specific definition of the source language, the generation of system-independent control commands for other complex systems is altered.

In a further exemplary embodiment of the method, a relation, for example source, is established between the textual formulations of the rule set and the semantic representation to enable a higher error transparency and a targeted error analysis for the results produced during the validation of contradictions.

In an exemplary embodiment of the method, at least one of the following conditions applies to the processing of the user specifications in the form of the textual formulation of the rule set:

At least one textual formulation of the rule set includes at least one declaration corresponding to the grammatical requirements, that can be converted into a semantic representation according to the previous exemplary descriptions;

At least one textual formulation of the rule set defines a plurality of system-independent actors, wherein:
  i. from the plurality of actors, one or more actors serve to read out at least one parameter of a current system state of the target platform;
  ii. from the plurality of actors, one or more actors permit setting at least one parameter of the target platform;
  iii. from the plurality of actors, one or more actors permit querying an option for at least one parameter of the target platform; and/or
  iv. from the plurality of actors, one or more actors serve to set a logic state in the rule set;

the conversion of the actors generates an unambiguous control sequence according to at least one linearization command when sequencing the plurality of platform-specific instructions;

a conversion of at least one control command into a plurality of platform-specific instructions serves for driving a target platform; and/or at least one control command permits a target-system-dependent control command for other complex systems and thus permits the triggering of events.

In an exemplary embodiment of the method, the semantic representation includes at least one instantiation, wherein the latter includes one or more values for symbols of the semantic representation that correspond to one or more measurable ACTUAL states of an external complex system and through a non-procedural and non-functional control are held in a regulated DESIRED state resp. are changed in the direction of a TARGET state in that, by a linearization of the logically required steps, a continuous change of the domain- or application-specific actors is carried out.

A further exemplary embodiment of the method further comprises transferring the semantic representation into a formal text taking into account the formulated domain-specific specifications of the user, however, the output specifications can deviate from the original input specifications and thus the transfer of problem descriptions and the corresponding solutions between use domains and languages are made possible while maintaining the logical statement content of the formulated rules.

According to an exemplary embodiment of the method, values for symbols of the semantic representation in the instances, the versioning, and the count of the options from an OR-combined set of statements are specified by intervals whose values of the boundaries can assume both floating-comma representations, integer, and also symbolic values inclusive of the respective marginal approximation and also any large or small numbers and thus formulate validity ranges, that a validation of the rule set, see FIG. 7, in the form of the semantic representation for completeness, consistency of the rule set, or its application to an individual case is reduced by reduction of the necessary permutations in the solution space to the critical symbols at the boundaries of the intervals.

It should be obvious that the present disclosure is not limited to a specific design of the methods, devices and systems shown in FIGS. 1 to 7. For example, other schematics can be used for textual rule sets and other control commands or instructions. The rule sets can further be transformed according to modifications of the illustrated implementation methods into the respective control commands. The present disclosure is not restricted to a specific illustrated syntax or semantic of the rule sets, the semantic representation, or the target-system-dependent control commands. Over and above this, the features disclosed in the description above, the claims and the figures may be of importance both individually and also in any combination for the realization of the disclosure in its different embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A computer-implemented method for generating control commands, comprising:
  providing, to a processor or a processing unit of a computer, a document that includes at least one declaration that formulates a rule set; and
  automatically, by the processor or processing unit:
    parsing the at least one declaration to generate a plurality of syntactical blocks;
    constructing terms and symbols from the syntactical blocks, to generate a semantic representation, wherein the semantic representation includes at least one semantic tree, the semantic tree including a plurality of terms and symbols that unambiguously represent both semantics and logical connections of the rule set;
    validating the semantic representation, wherein validating the semantic representation includes an automatic validation of the rule set in terms of at least one of completeness, consistency, or application to an individual case, wherein the validation of the semantic representation includes a recursive semantic tree analysis of the at least one semantic tree for recognizing first order errors and second order errors in the semantic representation, wherein a first order error is directly recognized without further analysis of the remaining rule set using stored data and wherein a second order error is determined through combinatorics or symbolic reshaping of terms and their logical evaluation; and
    generating at least one control command based on the validated semantic representation;
    converting the at least one control command into a plurality of executable platform-specific instructions; and
    in response to execution of the plurality of executable platform-specific instructions, driving an operation or operational state of a target platform, wherein the at least one control command corresponds to the rule set formulated by the at least one declaration.

2. The method according to claim 1, wherein the at least one declaration includes a textual formulation of the rule set.

3. The method according to claim 1, wherein the at least one control command is a target-system-dependent control command.

4. The method according to claim 1, wherein the plurality of executable platform-specific instructions includes a plurality of actors that translate the target platform into a target state.

5. The method according to claim 4, wherein the plurality of actors includes one or more of an actor for setting at least one parameter of the target platform, an actor for reading out at least one parameter of a current system state of the target platform, or an actor for querying an option for at least one parameter of the target platform.

6. The method according to claim 1, wherein the conversion includes sequencing of the plurality of executable platform-specific instructions according to at least one linearization command.

7. The method according to claim 1, wherein the at least one semantic tree includes a plurality of elements, wherein one or more of the plurality of elements includes at least one reference to a further element of the plurality of elements.

8. The method according to claim 7, wherein the at least one reference is implemented by hashed lists and access indices.

9. The method according to claim 1, wherein the recursive semantic tree analysis starts with terms that constitute roots of the at least one semantic tree.

10. The method according to claim 1, wherein the semantic representation includes at least one instantiation, wherein the at least one instantiation includes one or more values for symbols of the semantic representation.

11. The method according to claim 1, further comprising transferring the semantic representation into a formal text corresponding to the at least one declaration in the document.

12. A device for generating control commands, the device comprising:
   a processor and a memory having machine-readable instructions for execution on the processor, the instructions, when executed by the processor, provide on the processor or one or more hardware units of the device a plurality of logical components, including:
   a receiving component configured to receive a document that includes at least one declaration that formulates a rule set;
   a structuring component configured to structure the at least one declaration, to generate a plurality of syntactical blocks;
   a construction component configured to construct terms and symbols from the syntactical blocks, to generate a semantic representation, wherein the semantic representation includes at least one semantic tree, the semantic tree including a plurality of terms and symbols that unambiguously represent both semantics and logical connections of the rule set;
   a validation component configured to validate the semantic representation, wherein the validation of the semantic representation includes an automatic validation of the rule set in terms of at least one of completeness, consistency, or application to an individual case, wherein the validation of the semantic representation includes a recursive semantic tree analysis of the at least one semantic tree for recognizing first order errors and second order errors in the semantic representation, wherein a first order error is directly recognized without further analysis of the remaining rule set using stored data and wherein a second order error is determined through combinatorics or symbolic reshaping of terms and their logical evaluation;
   a generator component configured to generate at least one control command based on the validated semantic representation, wherein the at least one control command corresponds to the rule set formulated by the at least one declaration;
   a converting component configured to convert the at least one control command into a plurality of executable platform-specific instructions; and
   an execution component configured to, in response to execution of the plurality of executable platform-specific instructions, drive an operation or operational state of a target platform.

13. A system, comprising:
   an open- and/or closed-loop platform translatable by at least one control command into a system state;
   at least one memory medium that stores at least one declaration that formulates a rule set for the platform; and
   at least one device, that includes
      a processor, and
      a memory having machine-readable instructions for execution by the processor, the instructions, when executed by the processor, set up the processor to generate, from the rule set formulated by the at least one declaration, the at least one control command for the platform and further to execute a method, comprising:
         receiving a document that includes the at least one declaration that formulates the rule set;
         parsing the at least one declaration to generate a plurality of syntactical blocks;
         constructing terms and symbols from the syntactical blocks, to generate a semantic representation, wherein the semantic representation includes at least one semantic tree, the semantic tree including a plurality of terms and symbols that unambiguously represents both semantics and logical connections of the rule set;
         validating the semantic representation, wherein validating the semantic representation includes:
            employing an automatic validation of the rule set in terms of at least one of completeness, consistency, or application to an individual case;
            employing a recursive semantic tree analysis of the at least one semantic tree for recognizing first order errors and second order errors in the semantic representation, including:
               directly recognizing a first order error without further analysis of the remaining rule set using stored data; and
               determining a second order error through combinatorics or symbolic reshaping of terms and their logical evaluation;
         generating the at least one control command based on the validated semantic representation, wherein the at least one control command corresponds to the rule set formulated by the at least one declaration;
         converting the at least one control command into a plurality of executable platform-specific instructions; and in response to execution of the plurality of executable platform-specific instructions, driving an operation or operational state of the platform.

14. The system according to claim 13, wherein the at least one control command translates the platform into a target state specified in the rule set formulated by the at least one declaration.

* * * * *